US011514259B2

(12) United States Patent
Yang et al.

(10) Patent No.: US 11,514,259 B2
(45) Date of Patent: Nov. 29, 2022

(54) METHOD FOR BUILDING PERSONAL STYLE DATABASE AND APPARATUS THEREFOR

(71) Applicant: LG ELECTRONICS INC., Seoul (KR)

(72) Inventors: In Jung Yang, Seoul (KR); Ja Hee Hur, Seoul (KR)

(73) Assignee: LG ELECTRONICS INC., Seoul (KR)

(*) Notice: Subject to any disclaimer, the term of this patent is extended or adjusted under 35 U.S.C. 154(b) by 594 days.

(21) Appl. No.: 16/564,815

(22) Filed: Sep. 9, 2019

(65) Prior Publication Data

US 2019/0392251 A1 Dec. 26, 2019

(30) Foreign Application Priority Data

Aug. 8, 2019 (KR) ........................ 10-2019-0096765

(51) Int. Cl.

*G06K 9/62* (2022.01)
*G06N 3/08* (2006.01)
*H04L 67/306* (2022.01)
*H04L 12/28* (2006.01)

(52) U.S. Cl.

CPC ............ *G06K 9/6215* (2013.01); *G06N 3/08* (2013.01); *H04L 12/2829* (2013.01); *H04L 67/306* (2013.01); *H04L 2012/285* (2013.01)

(58) Field of Classification Search

CPC .... G06K 9/6215; G06N 3/08; H04L 12/2829; H04L 67/306; H04L 2012/285
See application file for complete search history.

(56) References Cited

U.S. PATENT DOCUMENTS

2020/0175518 A1* 6/2020 Chu ..................... G06Q 20/405
2021/0142097 A1* 5/2021 Zheng .................. G06V 10/454

FOREIGN PATENT DOCUMENTS

KR 10-0370363 B1 1/2003
KR 10-1954032 B1 3/2019

* cited by examiner

*Primary Examiner* — Brian Whipple
(74) *Attorney, Agent, or Firm* — Birch, Stewart, Kolasch & Birch, LLP

(57) ABSTRACT

A personal style database building apparatus and method in which communicate a plurality of clothing processing appliances, and a server with each other in a 5G communication environment by executing a loaded artificial intelligence (AI) algorithm and/or a machine learning algorithm. The personal style database building method according to an exemplary embodiment of the present disclosure includes analyzing first and second clothing image information collected from a first and a second clothing processing appliance to be built the first and the second clothing image information as first and second clothing record information in a database, comparing the first and the second clothing record information, and building merged record information in which the first and the second clothing record information in the database when a similarity between the first and the second clothing record information is equal to or higher than a predetermined reference value as a comparison result.

11 Claims, 6 Drawing Sheets

FIG. 4

| DATE (YEAR, MONTH, DAY, TIME) | USER SCHEDULE INFORMATION | TRANSPORTATION INFORMATION ON WHICH USER RIDES | CLOTHING IMAGE INFORMATION (FACE RECOGNITION TO IDENTIFY USER) | CLOTHING PROPERTY INFORMATION | WEATHER INFORMATION | | | | OPERATION MODE OF FIRST CLOTHING PROCESSING APPLIANCE | OPERATION MODE OF SECOND CLOTHING PROCESSING APPLIANCE | ... |
|---|---|---|---|---|---|---|---|---|---|---|---|
| | | | | | TEMPERATURE | HUMIDITY | FINE DUST | SEASON | | | |
| | | | | | | | | | | | ... |
| | | | | | | | | | | | ... |
| | | | | | | | | | | | ... |
| ⋮ | ⋮ | ⋮ | ⋮ | ⋮ | ⋮ | ⋮ | ⋮ | ⋮ | ⋮ | ⋮ | ⋮ |

METHOD FOR BUILDING PERSONAL STYLE DATABASE AND APPARATUS THEREFOR

CROSS-REFERENCE TO RELATED APPLICATION

This present application claims benefit of priority to Korean Patent Application No. 10-2019-0096765, entitled "METHOD FOR BUILDING PERSONAL STYLE DATABASE AND APPARATUS THEREFOR", filed on Aug. 8, 2019, in the Korean Intellectual Property Office, the entire disclosure of which is incorporated herein by reference.

BACKGROUND

1. Technical Field

The present disclosure relates to a method and an apparatus for building a personal style database, and more particularly, to a method and an apparatus for building a personal style database which collect and learn user's personal clothing related information from a plurality of clothing processing appliances to build a user's personal style database and output clothing recommendation information.

2. Description of the Related Art

The clothing processing appliances refer to all kinds of apparatuses which take care of the clothing or process the clothing at home, such as washing, drying, wrinkle-removing of clothing. For example, the clothing processing appliances include a washing machine which washes the clothing, a drying machine which dries the clothing, a washing and drying machine which performs both the washing function and the drying function, a refresher which refreshes the clothing, and a steamer which remove unnecessary wrinkles of the clothing.

Among the clothing processing appliances, more specifically, the refresher is a clothing processing appliance which makes the clothing more comfortable and fresher and performs a function of drying the clothing, supplying fragrance to the clothing, preventing static electricity from generating in the clothing, and removing the wrinkle of the clothing. The steamer is a clothing processing appliance which supplies steams to the clothing to remove the wrinkles of the clothing and differently from a general iron, a thermal plate is not in contact with the clothing so that the wrinkles of the clothing may be delicately removed. A clothing processing appliance which has both functions of the refresher and the steamer to perform a function of removing the wrinkles and smells of the clothing contained therein using steam and hot air has been known.

The related art 1 discloses a clothing cleaning management device which simultaneously, simply, and efficiently performs drying, sterilizing, wrinkle-preventing of clothing by providing steam, drying, and moving hanger to the clothing stored in the device.

The related art 2 discloses a multipurpose clothing dryer which applies hot and humid air when the clothing is dried to remove the wrinkles and provides sterilizing and deodorizing effects and is also used as a closet if necessary.

According to the related arts 1 and 2, the clothing cleaning management device and the clothing dryer which are clothing processing appliances independently operate so that even though the same clothing is processed, the clothing related information cannot be shared between two clothing processing appliances. Therefore, the user's personal style cannot be output by building the user's personal style database.

The above-described background arts are technical information acquired by the inventor for the contents to be disclosed or derived from the contents to be disclosed so that it cannot be referred to as known arts disclosed to the general public prior to the filing of the contents to be disclosed.

RELATED ART DOCUMENT

Patent Document

Related Art 1: Korean Registered Patent Publication No. 10-1954032 (published on Feb. 25, 2019)

Related Art 2: Korean Registered Patent Publication No. 10-0370363 (published on Jan. 16, 2003)

SUMMARY OF THE INVENTION

An object of the present disclosure is to build a user's personal style database by collecting and learning user's personal clothing related information from a plurality of clothing processing appliances.

An object of the present disclosure is to build a user's personal style database by automatically collecting and learning clothing information through a plurality of clothing processing appliances without personally registering the clothing related information by the user.

An object of the present disclosure is to output clothing recommendation information suitable for weather information, based on clothing related history information and weather information built in a personal style database.

An object of the present disclosure is to output clothing recommendation information suitable for weather information and user's schedule information, based on clothing related history information, weather information, and user's schedule information built in a personal style database.

An object of the present disclosure is to output clothing recommendation information suitable for weather information and transportation information on which the user rides, based on clothing related history information, weather information, and transportation information on which the user rides built in a personal style database.

An object of the present disclosure is to output operation mode recommendation information of a clothing processing appliance when clothing corresponding to clothing information built in a personal style data is put into a clothing processing appliance.

A personal style database building method according to an exemplary embodiment of the present disclosure may include collecting and learning user's personal clothing related information from a plurality of clothing processing appliances to build a user's personal style database and output clothing recommendation information.

Specifically, according to an aspect of the present disclosure, a personal style database building method includes: analyzing first clothing image information collected from a first clothing processing appliance to generate first clothing property information and build the first clothing property information as first clothing record information in a database; analyzing second clothing image information collected from a second clothing processing appliance to generate second clothing property information and build the second clothing property information as second clothing record information in a database; comparing the first clothing record information and the second clothing record information; and building merged record information in which the first clothing record information and the second clothing record information are merged, in the database, when as a comparison result of the first clothing record information and the second clothing record information, a similarity between the first clothing record information and the second clothing record information is equal to or higher than a predetermined reference value.

By providing the personal style database building method according to the embodiment of the present disclosure, a personal style database may be built by collecting clothing related information from the clothing processing appliance without personally and directly registering clothing related information.

Further, the building as first clothing record information includes: building the first clothing property information, first date information when the first clothing image information is collected, first weather information corresponding to the first date information, and user ID information generated by face recognition of a user included in the first clothing image information as the first clothing record information in the database and the building as second clothing record information includes: building the second clothing property information, second date information when the second clothing image information is collected, and second weather information corresponding to the second date information as the second clothing record information in the database.

Further, the building as first clothing record information may include: generating the first clothing property information by analyzing the first clothing image information using a deep neutral network model which is trained in advance to analyze clothing image information to extract property information of clothing.

Further, the building of merged record information may include: generating user ID information for identifying the user through the face recognition of the user included in the first clothing image information to be included in the merged record information.

Further, the building of merged record information may include: collecting operation mode information of the first clothing processing appliance corresponding to clothing included in the first clothing image information; collecting operation mode information of the second clothing processing appliance corresponding to clothing included in the second clothing image information; and including operation mode information of the first clothing processing appliance and operation mode information of the second clothing processing appliance in the merged record information.

Further, the building of merged record information may include: collecting schedule information of the user from a user terminal; collecting transportation information on which the user rides from a user terminal; and including the schedule information of the user and the transportation information on which the user rides in the merged record information.

Further, the personal style database building method according to an exemplary embodiment of the present disclosure may further include: receiving clothing image information which is worn by a user who stays in front of the first clothing processing appliance for a predetermined time or longer; receiving weather information on a date when the image information of the clothing worn by the user is received and time information when the clothing image information worn by the user is received; and generating a clothing recommendation deep neural network model for predicting clothing to be worn by the user at a specific time on a specific date based on the merged record information including the image information of the clothing worn by the user, the weather information, and time information when the clothing image information worn by the user is received.

Further, the personal style database building method according to an exemplary embodiment of the present disclosure may further include: collecting schedule information of the user from a user terminal; and the generating of a clothing recommendation deep neural network model includes: generating a clothing recommendation deep neural network model for predicting clothing to be worn by the user at a specific time on a specific date based on the merged record information including the image information of the clothing worn by the user, the weather information, the time information when the clothing image information worn by the user is received, and the schedule information of the user.

Further, the personal style database building method according to an exemplary embodiment of the present disclosure may further include: collecting transportation information on which the user rides, from a user terminal; the generating of a clothing recommendation deep neural network model includes: generating a clothing recommendation deep neural network model for predicting clothing to be worn by the user at a specific time on a specific date based on the merged record information including the image information of the clothing worn by the user, the weather information, time information when the clothing image information worn by the user is received, and the transportation information on which the user rides.

Further, after the generating of a clothing recommendation deep neural network model, the personal style database building method includes: detecting that the user stays in front of the first clothing processing appliance for a predetermined time or longer; outputting clothing to be recommended to the user by applying the clothing recommendation deep neural network model based on the time information when the user stays in front of the first clothing processing appliance; receiving an acceptance response or a rejection response for the clothing to be recommended from the user; and retraining the clothing recommendation deep neural network model in response to the acceptance response or the rejection response of the user.

Further, the personal style database building method according to an exemplary embodiment of the present disclosure may further include: receiving information indicating that clothing worn by the user included in the first clothing image information is put into the first clothing processing appliance or the second clothing processing appliance; determining an operation mode of the first clothing processing appliance or the second clothing processing appliance, based on the image information of the clothing worn by the user and weather information on a date when the clothing is worn; outputting an operation mode of the first clothing processing appliance or the second clothing processing appliance; and including the operation mode of the first clothing processing appliance or the second clothing processing appliance selected by the user in the merged record information.

According to another aspect of the present disclosure, a personal style database building apparatus includes: a first building unit which analyzes first clothing image information collected from a first clothing processing appliance to generate first clothing property information and build the first clothing property information in a database as first clothing record information; a second building unit which analyzes second clothing image information collected from a second clothing processing appliance to generate second clothing property information and build the second clothing property information in the database as second clothing record information; a comparing unit which compares the first clothing record information and the second clothing record information; and a third building unit which builds merged record information in which the first clothing record information and the second clothing record information are merged, in the database, when as a comparison result of the first clothing record information and the second clothing record information, a similarity between the first clothing record information and the second clothing record information is equal to or higher than a predetermined reference value.

By providing the personal style database building apparatus according to the embodiment of the present disclosure, a personal style database may be built by collecting clothing related information from the clothing processing appliance without personally and directly registering clothing related information.

Further, the first building unit may be configured to build the first clothing property information, first date information when the first clothing image information is collected, first weather information corresponding to the first date information, and user ID information generated by the user's face recognition included in the first clothing image information in the database as the first clothing record information and the second building unit may be configured to build the second clothing property information, second date information when the second clothing image information is collected, and second weather information corresponding to the second date information, in the database as the second clothing record information.

Further, the first building unit may be configured to generate the first clothing property information by analyzing the first clothing image information using a deep neutral network model which is trained in advance to analyze clothing image information to extract property information of clothing.

Further, the third building unit may be configured to collect schedule information of the user from a user terminal, collect transportation information on which the user rides from the user terminal, and include the schedule information of the user and the transportation information on which the user rides in the merged record information.

Further, the personal style database building apparatus according to an exemplary embodiment of the present disclosure may further include: a first notifying unit which receives the clothing image information worn by the user who stays in front of the first clothing processing appliance for a predetermined time or longer, weather information on a date when the clothing image information worn by the user is received, and time information when the clothing image information worn by the user is received and generates a clothing recommendation deep neural network model for predicting clothing to be worn by the user at a specific time on a specific date based on the merged record information including the clothing image information of the worn by the user, the weather information, and the time information when the clothing image information worn by the user is received.

Further, the personal style database building apparatus according to an exemplary embodiment of the present disclosure may further include: a fourth collecting unit which collects schedule information of the user from a user terminal, and the first notifying unit may be configured to generate a clothing recommendation deep neural network model for predicting clothing to be worn by the user at a specific time on a specific date based on the merged record information including the image information of the clothing worn by the user, the weather information, time information when the clothing image information worn by the user is received, and schedule information of the user.

Further, the personal style database building apparatus according to an exemplary embodiment of the present disclosure may further include: a fifth collecting unit which collects transportation information on which the user rides, from a user terminal; and the first notifying unit may be configured to generate a clothing recommendation deep neural network model for predicting clothing to be worn by the user at a specific time on a specific date based on the merged record information including the image information of the clothing worn by the user, the weather information, time information when the clothing image information worn by the user is received, and the transportation information on which the user rides.

The first notifying unit may be configured to after generating the clothing recommendation deep neural network model, detect that the user stays in front of the first clothing processing appliance for a predetermined time or longer, output clothing to be recommended to the user by applying the clothing recommendation deep neural network model based on the time information when the user stays in front of the first clothing processing appliance, receives an acceptance response or a rejection response for the clothing to be recommended from the user, and retrain the clothing recommendation deep neural network model in response to the acceptance response or the rejection response of the user.

Further, the personal style database building apparatus according to an exemplary embodiment of the present disclosure may further include a second notifying unit which when receiving putting of clothing worn by the user included in the first clothing image information into the first clothing processing appliance or the second clothing processing appliance, determines an operation mode of the first clothing processing appliance or the second clothing processing appliance, based on the image information of the clothing worn by the user and weather information on a date when the clothing is worn, transmit the operation mode of the first clothing processing appliance or the second clothing processing appliance to the user terminal, and includes the operation mode of the first clothing processing appliance or the second clothing processing appliance selected by the user in the merged record information.

In addition, another method and another system for implementing the present disclosure and a computer readable recording medium in which a computer program for executing the method is stored may be further provided.

Other aspects, features, and advantages other than those described above will become apparent from the following drawings, claims, and the detailed description of the present invention.

According to the embodiment of the present disclosure, a personal style database may be built by collecting clothing related information from the clothing processing appliance without personally and directly registering clothing related information.

Further, a user's personal style database may be built by automatically collecting and learning clothing information through a plurality of clothing processing appliances without registering the clothing related information by the user.

Further, clothing recommendation information suitable for weather information is output by learning image information of clothing worn by a user, merged record information built in a personal style database, and weather information, thereby helping the user to wear the clothing.

Further, clothing recommendation information suitable for weather information and user's schedule information is output by learning image information of clothing worn by a user, merged record information built in a personal style database, weather information, and the user's schedule information, thereby helping the user to wear the clothing.

Further, clothing recommendation information suitable for the user is output based on the weather information and the transportation information on which the user rides by learning image information of clothing worn by a user, merged record information built in a personal style database, weather information, and transportation information on which the user rides, thereby helping the user to wear the clothing.

Further, when clothing corresponding to merged record information built in a personal style database is put into the clothing processing appliance, an operation mode recommendation of the clothing processing appliance is output so that the user may conveniently operate the clothing processing appliance.

The above-mentioned embodiments of the present disclosure may be implemented as a computer program executable by various components on a computer, and such the computer program may be recorded in a computer-readable medium.

The effects of the present disclosure are not limited to those mentioned above, and other effects not mentioned can be clearly understood by those skilled in the art from the following description.

BRIEF DESCRIPTION OF THE DRAWINGS

The above and other aspects, features, and advantages of the present disclosure will become apparent from the detailed description of the following aspects in conjunction with the accompanying drawings, in which:

FIG. 4 is an exemplary view of merged record information built in a database of a personal style database building apparatus of FIG. 3;

DETAILED DESCRIPTION

Figure 1:
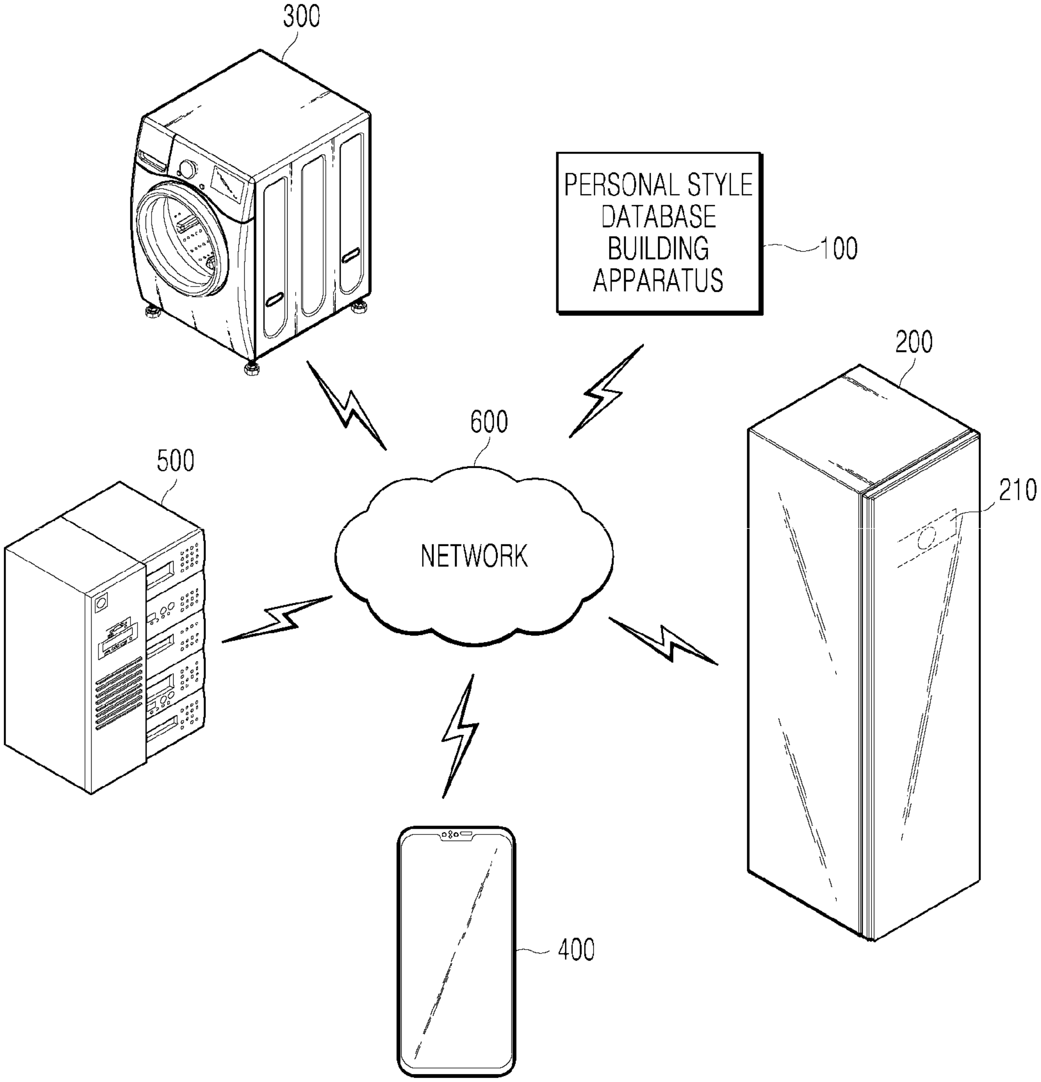
FIG. 1 is an exemplary view of a personal style database building environment including a personal style database building apparatus according to an exemplary embodiment of the present disclosure, clothing processing appliances, a user terminal, a server, and a network which connects the above-mentioned components.

Advantages and features of the present disclosure and methods for achieving them will become apparent from the descriptions of aspects herein below with reference to the accompanying drawings. However, the description of particular example embodiments is not intended to limit the present disclosure to the particular example embodiments disclosed herein, but on the contrary, it should be understood that the present disclosure is to cover all modifications, equivalents and alternatives falling within the spirit and scope of the present disclosure. The example embodiments disclosed below are provided so that the present disclosure will be thorough and complete, and also to provide a more complete understanding of the scope of the present disclosure to those of ordinary skill in the art. In the interest of clarity, not all details of the relevant art are described in detail in the present specification in so much as such details are not necessary to obtain a complete understanding of the present disclosure.

The terminology used herein is used for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "includes," "including," "containing," "has," "having" or other variations thereof are inclusive and therefore specify the presence of stated features, integers, steps, operations, elements, and/or components, but do not preclude the presence or addition of one or more other features, integers, steps, operations, elements, components, and/or groups thereof Furthermore, these terms such as "first," "second," and other numerical terms may be used herein only to describe various elements, but these elements should not be limited by these terms. These terms may be only used to distinguish one element, component, region, layer or section from another region, layer or section.

Hereinbelow, the embodiments of the present disclosure will be described in greater detail with reference to the accompanying drawings, and on all these accompanying drawings, the identical or analogous elements are designated by the same reference numeral, and repeated description of the common elements will be omitted.

FIG. 1 is an exemplary view of a personal style database building environment including a personal style database building apparatus according to an exemplary embodiment of the present disclosure, clothing processing appliances, a user terminal, a server, and a network which connects the above-mentioned components. Referring to FIG. 1, the personal style database building environment may include a personal style database building apparatus 100, a first clothing processing appliance 200, a second clothing processing appliance 300, a user terminal 400, a server 500, and a network 600.

Figure 3:
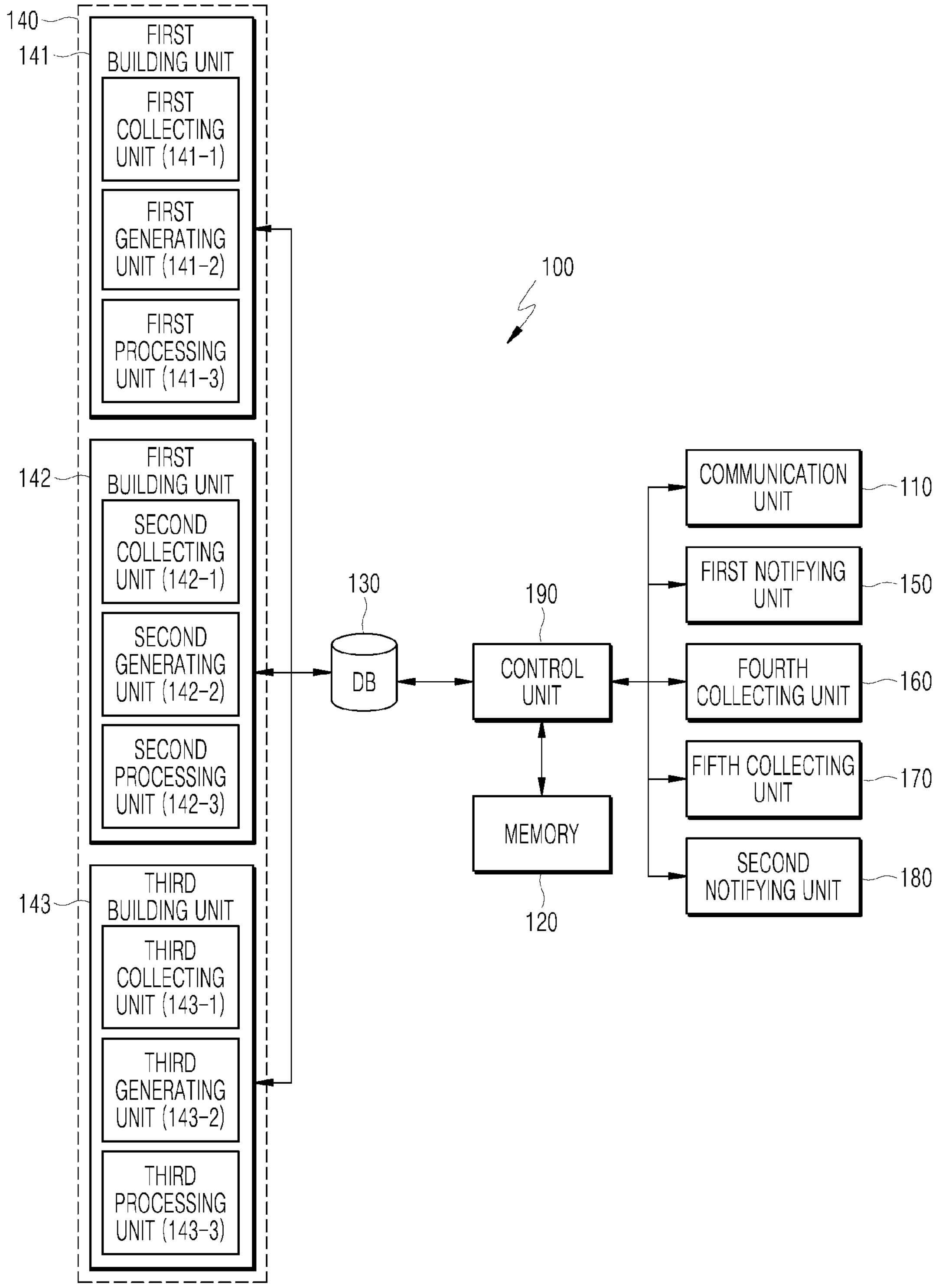
FIG. 3 is a view for schematically explaining a detailed configuration of a personal style database building apparatus of FIG. 1.

The personal style database building apparatus 100 may build clothing record information to the database 130 (see FIG. 3) by analyzing clothing image collected from a plurality of clothing processing appliances 200 and 300 to generate clothing property information and when as a result of comparing the plurality of clothing record information, a similarity is equal to or higher than a predetermined reference value, build merged recording information obtained by merging a plurality of clothing record information in the database 130 (see FIG. 3).

Here, the plurality of clothing processing appliances may include the first clothing processing appliance 200 and the second clothing processing appliance 300. The first clothing processing appliance 200 may collectively refer to a device which removes dirt on the clothing by applying water into a processing chamber in which the clothing is stored or dries wet clothing by applying dry air, or refreshes (for example, removes wrinkles or smell) the clothing by blowing air or applying moisture. Further, the second clothing processing appliance 300 may include all a device which washes the clothing, a device which dries the clothing, and a device which simultaneously washes and dries the clothing. The washing of clothing may include a course of removing contaminant from the laundry through an action of water and detergents and the drying of clothing may include a course of removing moisture contained in the clothing by a hot air supply device. In the meantime, the plurality of clothing processing appliances is not limited to the first clothing processing appliance 200 and the second clothing processing appliance 300 described above, but may include any of home appliances which process the clothing.

Further, the personal style database building apparatus 100 uses a deep neural network model which is trained in advance to extract property information of the clothing by analyzing the clothing image information to generate first clothing property information or second clothing property information by analyzing first clothing image information or second clothing image information.

When the merged record information is built, the personal style database building apparatus 100 generate user ID information for identifying a user by face recognition of a user included in the first clothing image information received from the first clothing processing appliance 200 and includes the user ID information in the merged record information to distinguish the user.

When the merged record information is built, the personal style database building apparatus 100 may include operation mode information of the first clothing processing appliance 200 and/or the second clothing processing appliance 300 corresponding to clothing information included in the clothing image information collected from the first clothing processing appliance 200 and/or the second clothing processing appliance 300 in the merged record information.

When the merged record information is built, the personal style database building apparatus 100 may collect weather information on a date when the image information is collected from the first clothing processing appliance 200 and/or the second clothing processing appliance 300, schedule information of the user and transportation information on which the user rides from the user terminal 400 to be included in the merged record information.

Further, even though not illustrated, the personal style database building apparatus 100 may collect image information of clothing worn by the user who stays in front of the first clothing processing appliance 200 for a predetermined time (for example, 5 seconds) and time information when the clothing image information worn by the user is received to be included in the merged record information.

As a selective embodiment, the personal style database building apparatus 100 receives the image information of the clothing worn by the user who stays in front of the first clothing processing appliance 200 for a predetermined time or longer, weather information on the date when the image information of the clothing worn by the user is received, and time information when the clothing image information worn by the user is received and generates a clothing recommendation deep neural network model for predicting clothing to be worn by the user at a specific time on a specific date based on the merged record information including the image information of the clothing worn by the user, weather information, and time information when the clothing image information worn by the user is received.

Further, after generating the clothing recommendation deep neural network model, the personal style database building apparatus 100 detects that the user stays in front of the first clothing processing appliance 200 for a predetermined time or longer, outputs clothing to be recommended to the user by applying the clothing recommendation deep neural network model based on the time information when the user stays in front of the first clothing processing appliance, receives an acceptance response or a rejection response for the clothing to be recommended from the user, and retrains the clothing recommendation deep neural network model in response to the acceptance response or the rejection response of the user. Here, the personal style database building apparatus 100 transmits information about the clothing to be recommended to the user through one or more of the first clothing processing appliance 200, the second clothing processing unit 300, and the user terminal 400 to allow the user to check the information.

As a selective embodiment, the personal style database building apparatus 100 may collect the schedule information of the user from the user terminal 400 and generate a clothing recommendation deep neural network model for predicting the clothing to be worn by the user at a specific time on a specific date based on the merged record information including the image information of the clothing worn by the user, the weather information, the time information when the clothing image information of the user is received, and the schedule information of the user.

As a selective embodiment, the personal style database building apparatus 100 may collect the transportation information on which the user rides from the user terminal 400 and generate a clothing recommendation deep neural network model for predicting the clothing to be worn by the user at a specific time on a specific date based on the merged record information including the image information of the clothing worn by the user, the weather information, the time information when the clothing image information of the user is received, and the transportation information on which the user rides.

As a selective embodiment, when the personal style database building apparatus 100 receives information indicating that the clothing worn by the user is put into the first clothing processing appliance 200 or the second clothing processing appliance 300, the personal style database building apparatus 100 determines an operation mode of the first clothing processing appliance 200 or an operation mode of the second clothing processing appliance 300 based on the image information of the clothing worn by the user and the weather information on the date when the user wears the clothing built in the merged record information, transmits the operation mode of the clothing processing appliance 200 or the second clothing processing appliance 300 to the user terminal 400, and includes the operation mode of the clothing processing appliance 200 or the second clothing processing appliance 300 selected by the user in the merged record information.

The user terminal 400 may access a personal style database building apparatus operating application or a personal style database building apparatus operating site and then receive a service for operating or controlling the personal style database building apparatus 100 through an authentication process. In the present embodiment, the user terminal 400 on which the authentication process is completed operates the personal style database building apparatus 100 and controls an operation of the personal style database building apparatus 100.

Further, the user terminal 400 may receive an output result from the personal style database building apparatus 100 and transmit feedback information of the user for the output result to the personal style database building apparatus 100.

Here, the output result may include the merged record information built by the personal style database building apparatus 100, clothing recommendation information provided by the personal style database building apparatus 100, and the operation mode of the first clothing processing appliance 200 or the second clothing processing appliance 300. Here, the clothing recommendation information is a result of determining a suitability of the clothing worn by the user and may include information for outputting the clothing when the clothing worn by the user is appropriate and information for recommending appropriate clothing when the clothing worn by the user is inappropriate.

In the present embodiment, the output result may be transmitted through one or more of the first clothing processing appliance 200 and the second clothing processing appliance 300 as well as the user terminal 400.

In the present embodiment, the user terminal 400 may be a desktop computer, smartphone, notebook, tablet PC, smart TV, cell phone, personal digital assistant (PDA), laptop, media player, micro server, global positioning system (GPS) device, electronic book terminal, digital broadcast terminal, navigation device, kiosk, MP3 player, digital camera, home appliance, and other mobile or immobile computing devices operated by the user, but is not limited thereto. Furthermore, the user terminal 400 may be a wearable terminal having a communication function and a data processing function, such as a watch, glasses, a hair band, a ring, or the like. The user terminal 400 is not limited to the above-mentioned devices, and thus any terminal that supports web browsing may be used as the user terminal 400.

The server 500 may be a database server which provides big data required to apply various artificial intelligence algorithms and data for operating the personal style database building apparatus 100. In addition, the server 500 may include a web server or an application server which remotely controls the operation of the personal style database building apparatus 100 using a personal style database building apparatus operating application or a personal style database building apparatus operating web browser installed in the user terminal 400.

Artificial intelligence (AI) is an area of computer engineering and information technology that studies how to make computers perform things humans are capable of doing with human intelligence, such as reasoning, learning, self-improving, and the like, or how to make computers mimic such intelligent human behaviors.

In addition, artificial intelligence does not exist on its own, but is rather directly or indirectly related to a number of other fields in computer science. In recent years, there have been numerous attempts to introduce an element of AI into various fields of information technology to solve problems in the respective fields.

Machine learning is an area of artificial intelligence that includes the field of study that gives computers the capability to learn without being explicitly programmed. More specifically, machine learning is a technology that investigates and builds systems, and algorithms for such systems, that are capable of learning, making predictions, and enhancing its own performance on the basis of experiential data. Machine learning algorithms, rather than only executing rigidly-set static program commands, may be used to take an approach that builds models for deriving predictions and decisions from inputted data.

The server 500 analyzes the clothing image information of the plurality of clothing processing appliances 200 and 300 collected from the personal style database building apparatus 100 to generate merged record information and transmit the merged record information to the personal style database building apparatus 100. As a selective embodiment, the server 500 generates a clothing recommendation deep neural network model for predicting clothing to be worn by the user at a specific time on a specific date based on the merged record information including the image information of the clothing worn by the use, the weather information, the time information when the clothing image information of the user is received, the schedule information, and the transportation information on which the user rides, collected from the personal style database building apparatus 100. The server 500 applies the clothing recommendation deep neural network model based on the time information when the user stays in front of the first clothing processing appliance 200 to transmit information about clothing to be recommended to the user to the personal style database building apparatus 100. When an acceptance response or a rejection response for the clothing to be recommended is received from the user through the personal style database building apparatus 100, the server 500 retrains the clothing recommendation deep neural network model in response to the acceptance response or the rejection response of the user.

When the server 500 receives information indicating that the clothing worn by the user is put into the first clothing processing appliance 200 or the second clothing processing appliance 300 from the personal style database building apparatus 100, the server 500 determines an operation mode of the first clothing processing appliance 200 or an operation mode of the second clothing processing appliance 300 based on the image information of the clothing worn by the user and the weather information on the date when the user wears the clothing built in the merged record information, transmits the operation mode of the clothing processing appliance 200 or the second clothing processing appliance 300 to the personal style database building apparatus 100 and/or the user terminal 400, and receives the operation mode of the clothing processing appliance 200 or the second clothing processing appliance 300 selected by the user to be included in the merged record information.

In the present embodiment, in accordance with a processing capacity of the personal style database building apparatus 100, the personal style database building apparatus 100 may perform at least some of the processes of building the merged recording information, learning and/or re-learning the clothing recommendation deep neural network model to recommend the clothing to the user, and recommending an operation mode of the first clothing processing appliance 200 and/or the second clothing processing appliance 300 which are performed by the server 500.

The network 500 may serve to connect the personal style database building apparatus 100, the first clothing processing appliance 200, the second clothing processing appliance 300, the user terminal 400, and the server 500 to each other. The network 600 includes, but is not limited to, wire-based networks such as LANs (local area networks), wide area networks (WANs), metropolitan area networks (MANs), and integrated service digital networks (ISDNs); or wireless networks such as wireless LANs, CDMA, Bluetooth communications, satellite communications, and so forth. Furthermore, the network 600 may transmit/receive information using short-range communications and/or long-distance communications. Examples of the short-range communication technologies may include Bluetooth, radio frequency identification (RFID), infrared data association (IrDA), ultra-wideband (UWB), ZigBee, and wireless fidelity (Wi- Fi). Examples of the long-range communication technologies may include code division multiple access (CDMA), frequency division multiple access (FDMA), time division multiple access (TDMA), orthogonal frequency division multiple access (OFDMA), and single carrier frequency division multiple access (SC-FDMA).

The network 600 may include a connection of network elements such as a hub, a bridge, a router, a switch, and a gateway. The network 600 may include one or more connected networks, for example, a multi-network environment, including a public network such as the Internet and a private network such as a secure corporate private network. Access to the network 600 may be provided via one or more wired or wireless access networks. Further, the network 600 may support 5G communication and/or an Internet of things (IoT) network for exchanging and processing information between distributed components such as objects.

Figure 2:
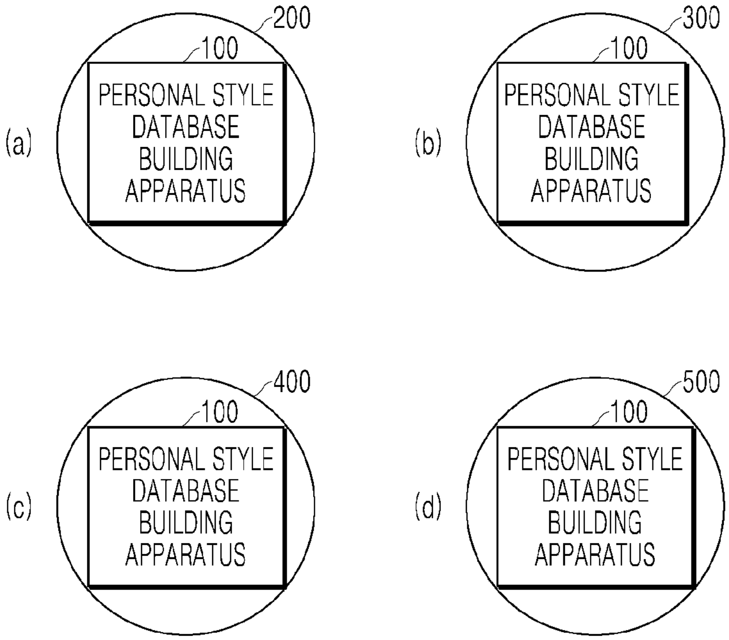
FIG. 2 is an exemplary view of a personal style database building environment illustrating an implementation example of a personal style database building apparatus according to another exemplary embodiment of the present disclosure.

FIG. 2 is an exemplary view of a personal style database building environment illustrating an implementation example of a personal style database building apparatus according to another exemplary embodiment of the present disclosure. In the following description, a repeated description of FIG. 1 will be omitted.

Referring to FIGS. 2A to 2D, the personal style database building apparatus 100 may be included in any one of the first clothing processing appliance 200, the second clothing processing appliance 300, the user terminal 400, and the server 500. The personal style database building apparatus 100 may be included in any one of the first clothing processing appliance 200, the second clothing processing appliance 300, the user terminal 400, and the server 500 in accordance with various ways. As a specific embodiment, the personal style database building apparatus 100 may be installed in any one of the first clothing processing appliance 200, the second clothing processing appliance 300, the user terminal 400, and the server 500 through the network 600. For example, the personal style database building apparatus 100 may be installed in any one of the first clothing processing appliance 200, the second clothing processing appliance 300, the user terminal 400, and the server 500 in the form of one application. As another specific embodiment, the personal style database building apparatus 100 may be installed in any one of the first clothing processing appliance 200, the second clothing processing appliance 300, the user terminal 400, and the server 500 through offline. However, this is an illustrative example and the present disclosure is not limited thereto. Therefore, the personal style database building apparatus 100 may be included in any one of the first clothing processing appliance 200, the second clothing processing appliance 300, the user terminal 400, and the server 500 in various forms.

FIG. 3 is a view for schematically explaining a detailed configuration of a personal style database building apparatus of FIG. 1. In the following description, a repeated description of FIGS. 1 to 2 will be omitted. Referring to FIG. 3, the personal style database building apparatus 100 may include a communication unit 110, a memory 120, a database 130, a building unit 140 including first building unit 141 to third building unit 143, a first notifying unit 150, a fourth collecting unit 160, a fifth collecting unit 170, a second notifying unit 180, and a control unit 190.

The communication unit 110 may interwork with the network 600 to provide a communication interface required to provide a transmitting/receiving signal between the personal style database building apparatus 100 and one or more of the first clothing processing appliance 200, the second clothing processing appliance 300, the user terminal 400, and the server 500 in the form of packet data. Moreover, the communication unit 110 may serve to receive a predetermined information request signal from the user terminal 400 and also serve to transmit information processed by the personal style database building apparatus 100 to the user terminal 400. Further, the communication unit 110 receives the clothing image information from the first clothing processing appliance 200 and/or the second clothing processing appliance 300 and transmits a result processed by the personal style database building apparatus 100, for example, the operation mode of the first clothing processing appliance 200 and/or the second clothing processing appliance 300 to the first clothing processing appliance 200 and/or the second clothing processing appliance 300. Further, the communication unit 110 transmits predetermined information request signal from the user terminal 400 to the server 500 and receives a response signal processed by the server 500 to transmit the signal to the user terminal 400. The communication unit 110 may be a device that includes hardware and software required for transmission/reception of signals such as control signals, data signals, and so forth, with other network devices through wire-based or wireless connections.

Furthermore, the communication unit 110 may support a variety of object-to-object intelligent communication (Internet of things (IoT), Internet of everything (IoE), Internet of small things (IoST), etc.), and may support machine to machine (M2M) communication, vehicle to everything (V2X) communication, device to device (D2D) communication, etc.

The memory 120 stores various information required for the operation of the personal style database building apparatus 100 and includes volatile or non-volatile recording medium. Further, the memory 120 may include result information processed by the personal style database building apparatus 100. For example, in the memory 120, a merged record building learning model for generating merged record information and/or a suitability determining learning mode for determining a suitability of the clothing worn by the user may be stored.

Here, the memory 120 may include magnetic storage media or flash storage media, but the scope of the present disclosure is not limited thereto. This memory 120 may include an internal memory and/or an external memory, and may include a volatile memory such as a DRAM, SRAM, SDRAM, or the like, a non-volatile memory such as a one time programmable ROM (OTPROM), PROM, EPROM, EEPROM, mask ROM, flash ROM, NAND flash memory, NOR flash memory, or the like, and a storage device such as an HDD or a flash drive such as an SSD, compact flash (CF) card, SD card, micro-SD card, mini-SD card, Xd card, a memory stick, or the like.

The database 130 may include a management database which stores information collected and generated by the personal style database building apparatus 100.

Here, the management database may store first clothing image information collected from the first clothing processing appliance 200 and first clothing property information (first clothing record information) generated by the building unit 140. Further, the management database may store second clothing image information collected from the second clothing processing appliance 300 and second clothing property information (second clothing record information) generated by the building unit 140. Moreover, the management database may store merged record information in which the first clothing record information and the second clothing record information are merged. Here, the merged record information may further include date information, weather information, user ID information, operation mode information of the first clothing processing appliance 200 and the second clothing processing appliance 300, schedule information of the user, transportation information on which the user rides, clothing recommendation information output to the user, clothing image information worn by the user, and time information when the clothing image information worn by the user is received.

Moreover, the database 130 may further include a user database which stores user information. Here, in the user database, user information may be stored as a principal agent who generates the merged record information and a recipient of a suitability determining result of the worn clothing. Here, the user information may include basic information about the user such as a name of the user, affiliation, personal information, gender, age, contact information, e-mail address, address, and face information of the user, authentication (login) information such as an ID (or e-mail) and a password, and access related information such as access country, access location, and information about a device used for access, and an accessed network environment.

The building unit 140 analyzes clothing image information collected from the first clothing processing appliance 200 and/or the second clothing processing appliance 300 to generate clothing property information, builds the clothing property information as a plurality of record information in the database 130, and builds merged record information in which the plurality of clothing record information is merged, in the database 130, when a similarity of the plurality of record information is equal to or higher than a predetermined reference value.

In the present embodiment, the building unit 140 may include first building unit 141 to third building unit 143. Here, the first building unit 141 includes a first collecting unit 141-1, a first generating unit 141-2, and a first processing unit 141-3, the second building unit 142 includes a second collecting unit 142-1, a second generating unit 142-2, and a second processing unit 142-3, and the third building unit 143 includes a third collecting unit 143-1, a third generating unit 143-2, and a third processing unit 143-3.

The first building unit 141 analyzes first clothing image information collected from the first clothing processing appliance 200 to generate first clothing property information and builds the first clothing property information as first clothing record information in the database 130.

The first collecting unit 141-1 collects first clothing image information including one or more of image information of the clothing worn by the user and image information representing that clothing is displayed in the first clothing processing appliance 200 from the first clothing processing appliance 200. In this case, a camera 210 (see FIG. 1) is equipped inside and/or outside the first clothing processing appliance 200 and a door of the first clothing processing appliance 200 is configured as a mirror so that image information about the clothing displayed in the first clothing processing appliance 200 and/or image information about the user and the clothing worn by the user at the outside of the first clothing processing appliance 200 are generated. The first collecting unit 141-1 may collect the first clothing image information including the image information about the clothing displayed in the first clothing processing appliance 200 and image information about the clothing worn by the user from the first clothing processing appliance 200.

The first generating unit 141-2 may generate first clothing property information including at least one of a type, a shape, a color, a pattern, a thickness, and a weight of a first clothing, through analysis of the collected first clothing image information. The first generating unit 141-2 may analyze the first clothing image information to generate first clothing property information using a deep neural network model which is trained in advance to analyze the clothing image information to extract property information of the clothing.

The first processing unit 141-3 may build the first clothing property information generated by the first generating unit 141-2, first date information when the first clothing image information is collected, first weather information corresponding to the first date information, and user ID information for identifying the user generated by the user face recognition included in the first clothing image information in the database 130 as first clothing record information.

The second building unit 142 analyzes second clothing image information collected from the second clothing processing appliance 300 to generate second clothing property information and builds the second clothing property information in the database 130 as second clothing record information.

The second collecting unit 142-1 may collect image information of the clothing which is put into the second clothing processing appliance 300, from the second clothing processing appliance 300. Here, a camera (not illustrated) is equipped in the second clothing processing appliance 300 to generate image information about the clothing which is put into the second clothing processing appliance 300 and the second collecting unit 142-1 may collect image information of the clothing which is put into the second clothing processing appliance 300, from the second clothing processing appliance 300.

The second generating unit 142-2 may generate second clothing property information including at least one of a type, a shape, a color, a pattern, a thickness, and a weight of a second clothing, through analysis of the collected second clothing image information. The second generating unit 142-2 may analyze the second clothing image information to generate second clothing property information using a deep neural network model which is trained in advance to analyze the clothing image information to extract property information of the clothing.

The second processing unit 142-3 may build second clothing property information generated by the second generating unit 142-2, second date information on which the second clothing image information is collected, and second weather information corresponding to the second date information in the database 130, as second clothing record information.

The third building unit 143 may compare the first clothing record information and the second clothing record information and when a similarity of the first clothing record information and the second clothing record information is equal to or higher than a predetermined reference value (for example, 70%), build merged record information in which the first clothing record information and the second clothing record information are merged in the database 130.

The third collecting unit 143-1 may collect the first clothing record information built by the first building unit 141 and the second clothing record information built by the second building unit 142.

The third generating unit 143-2 compares and analyzes the first clothing record information and the second clothing record information and when a similarity of the first clothing record information and the second clothing record information is equal to or higher than a predetermined reference value as a comparison result of the first clothing record information and the second clothing record information, generates merged record information in which the first clothing record information and the second clothing record information are merged. In the present embodiment, the third generating unit 143-2 may include a comparing unit (not illustrates) which compares the collected first clothing record information and second clothing record information.

The third processing unit 143-3 may build the merged record information generated by the third generating unit 143-2 in the database 130. The third processing unit 143-3 generates user ID information for identifying the user through face recognition of the user included in the first clothing image information received from the first clothing processing appliance 200 and includes the user ID information in the merged record information. By doing this, the merged record information may be built for every user.

Further, the third collecting unit 143-1 may collect operation mode information of the first clothing processing appliance 200 corresponding to clothing included in first clothing image information and operation mode information of the second clothing processing appliance 300 corresponding to clothing included in second clothing image information. Here, a similarity between the clothing included in the first clothing image information and the clothing included in the second clothing image information may be equal to or higher than a predetermined reference value (for example, similarity is 70%). The third processing unit 143-3 may include the operation mode information of the first clothing processing appliance 200 and the operation mode information of the second clothing processing appliance 300 in the merged record information.

Further, the third collecting unit 143-1 may collect schedule information of the user from the user terminal 400. Here, the schedule information may include schedule information planed by the user for every year, month, day, and time. Further, the third collecting unit 143-1 may collect transportation information on which the user rides from the user terminal 400. Here, the transportation information may include vehicle information such as buses, subways, taxis, and cars. The third processing unit 143-3 includes the schedule information of the user and the transportation information on which the user rides in the merged record information.

Further, the third collecting unit 143-1 may collect clothing image information worn by the user who stays in front of the first clothing processing appliance 200 for a predetermined time (for example, 5 seconds) and time information when the clothing image information worn by the user is received and the third processing unit 143-3 may include the clothing image information worn by the user and the time information when the clothing image information worn by the user is received in the merged record information.

FIG. 4 illustrates merged record information built in the database by the third building unit 143. Referring to FIG. 4, the merged record information may include date information including year, month, day, and time, schedule information of the user collected from the user terminal 400, transportation information on which the user rides, clothing image information (including distinguishing of a user through face recognition), clothing property information, weather information including a temperature, a humidity, fine dust, and season, operation mode information of the first clothing processing appliance 200, and operation mode information of the second clothing processing appliance 300. Here, in the case of the weather information, the temperature, the humidity, and fine dust are sub-divided to be stored for every time zone or for every event. Here, the event may include weather information compared with normal sunny weather, such as rain, typhoon, wind, or snow.

The first notifying unit 150 receives the image information of the clothing worn by the user who stays in front of the first clothing processing appliance 200 for a predetermined time (for example, 5 seconds) or longer, weather information on the date when the image information of the clothing worn by the user is received, and time information when the clothing image information worn by the user is received and generates a clothing recommendation deep neural network model for predicting clothing to be worn by the user at a specific time on a specific date based on the merged record information including the image information of the clothing worn by the user, the weather information, and the time information when the clothing image information worn by the user is received.

Figure 5:
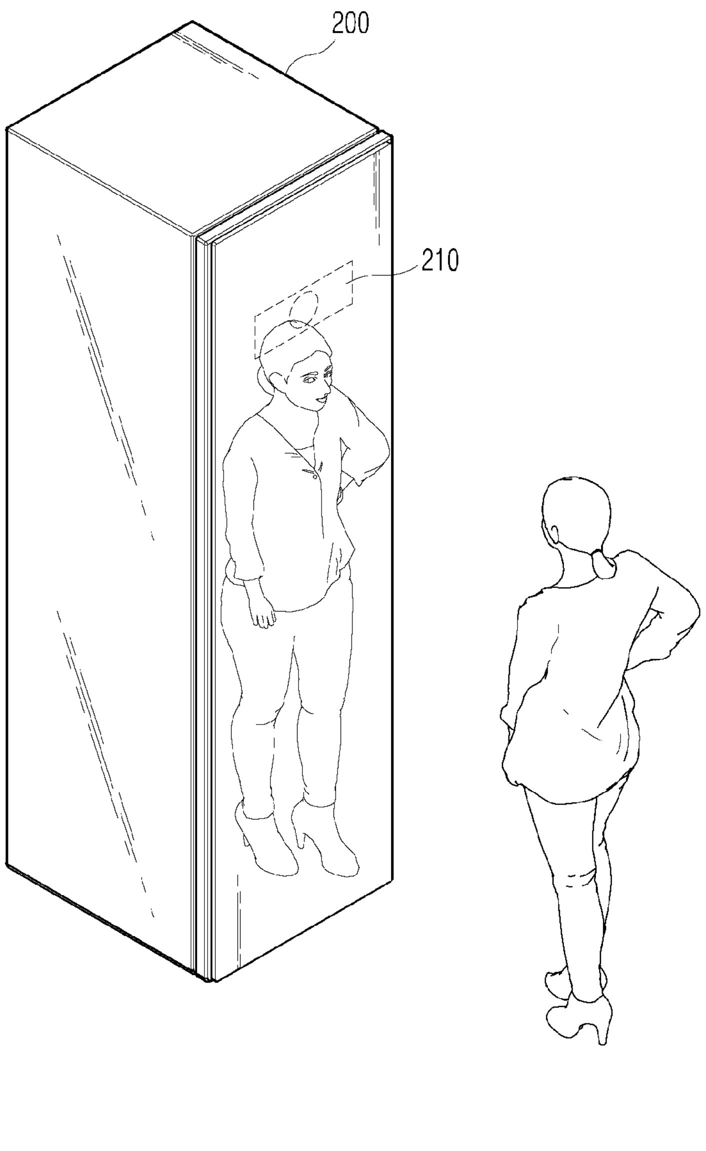
FIG. 5 is an exemplary view for explaining an operation of a personal style database building apparatus according to an exemplary embodiment of the present disclosure.

When the image information of the clothing worn by the user who stays in front of the first clothing processing appliance 200 for a predetermined time or longer is received, the notifying unit 150 determines that the user wears the clothing to go out and activates an operation of the clothing recommendation deep neural network model. FIG. 5 illustrates a situation in which the clothing worn by the user who stays in front of the first clothing processing appliance 200 for a predetermined time or longer is photographed by the camera 210.

After generating the clothing recommendation deep neural network model, the first notifying unit 150 detects that the user stays in front of the first clothing processing appliance 200 for a predetermined time or longer, outputs clothing to be recommended to the user by applying the clothing recommendation deep neural network model based on the time information when the user stays in front of the first clothing processing appliance, receives an acceptance response or a rejection response for the clothing to be recommended from the user, and retrains the clothing recommendation deep neural network model in response to the acceptance response or the rejection response of the user.

When the clothing to be recommended to the user is output by applying the clothing recommendation deep neural network model, the first notifying unit 150 determines a suitability of the clothing which is currently being worn by the user and when it is determined that the clothing worn by the user is appropriate for the weather information, outputs information indicating that the clothing worn by the user is appropriate. However, when it is determined that the clothing worn by the user is inappropriate for the weather information, the first notifying unit 150 may output information indicating that the clothing worn by the user is inappropriate. In this case, the first notifying unit 150 may display the clothing which was worn by the user for the same weather information as the above-described weather information to output recommendation information to wear anyone clothing. Here, the weather information may be subdivided to output recommendation information by assigning a priority to any one weather information.

For example, when weather information for that morning is rainy and weather information for that afternoon is sunny, any recommendation information may be output with the priority to the morning or afternoon. Any one recommendation information may be output in various forms in accordance with the above-described weather information, the schedule information of the user, and the transportation information on which the user rides, which will be described below.

The fourth collecting unit 160 may collect schedule information of the user from the user terminal 400. The fourth collecting unit 160 may load the schedule information of the user included in the merged record information built in the database 130 or collect new schedule information of the user from the user terminal 400. In the present embodiment, it is assumed that the fourth collecting unit 160 collects new schedule information of the user from the user terminal 400.

When the fourth collecting unit 160 collects new schedule information of the user from the user terminal 400, the first notifying unit 150 may generate a clothing recommendation deep neural network model for predicting clothing to be worn by the user at a specific time on a specific date, based on the merged record information including the clothing image information worn by the user who stays in front of the first clothing processing appliance 200 for a predetermined time or longer, the weather information, the time information when the clothing image information worn by the user is received, and the schedule information of the user. After generating the clothing recommendation deep neural network model, the first notifying unit 150 detects that the user stays in front of the first clothing processing appliance 200 for a predetermined time or longer, outputs clothing to be recommended to the user by applying the clothing recommendation deep neural network model based on the time information when the user stays in front of the first clothing processing appliance, receives an acceptance response or a rejection response for the clothing to be recommended from the user, and retrains the clothing recommendation deep neural network model in response to the acceptance response or the rejection response of the user.

For example, when a meeting with a partner company is set at 2 pm today according to the schedule information of the user and the image information of the clothing worn by the user is blue jeans and T-shirt, the first notifying unit 150 determines that the clothing worn by the user is inappropriate in terms of the schedule information of the user and outputs the information indicating that the clothing worn by the user is inappropriate. Further, the notifying unit 150 displays clothing which was worn by the user in the same situation of the past among the clothing possessed by the user based on the merged record information to output recommendation information to wear any one of the clothing.

The fifth collecting unit 170 may collect transportation information on which the user rides from the user terminal 400. Here, the fifth collecting unit 170 may load the transportation information of the user included in the merged record information built in the database 130 or collect new transportation information to be ridden by the user from the user terminal 400. In the present embodiment, it is assumed that the fifth collecting unit 170 collects new transportation information to be ridden by the user from the user terminal 400.

When the fifth collecting unit 170 collects the new transportation information to be ridden by the user from the user terminal 400, the first notifying unit 150 may generate a clothing recommendation deep neural network model for predicting clothing to be worn by the user at a specific time on a specific date, based on the merged record information including the clothing image information worn by the user who stays in front of the first clothing processing appliance 200 for a predetermined time or longer, the weather information, the time information when the clothing image information worn by the user is received, and the transportation information to be ridden by the user.

After generating the clothing recommendation deep neural network model, the first notifying unit 150 detects that the user stays in front of the first clothing processing appliance 200 for a predetermined time or longer, outputs clothing to be recommended to the user by applying the clothing recommendation deep neural network model based on the time information when the user stays in front of the first clothing processing appliance, receives an acceptance response or a rejection response for the clothing to be recommended from the user, and retrains the clothing recommendation deep neural network model in response to the acceptance response or the rejection response of the user.

For example, a result of determining a suitability when the transportation information on which the user rides is a bus and the weather information is rainy and a result of determining a suitability when the transportation information on which the user rides is a car and the weather information is rainy may be different from each other. If clothing worn by the user when the transportation information on which the user rides is a bus and the weather information is rainy is a long dress, the first notifying unit 150 determines that the clothing worn by the user is inappropriate in terms of the transportation information on which the user rides and the weather information and outputs information indicating that the clothing worn by the user is inappropriate. Further, the first notifying unit 150 displays clothing which was worn by the user in the same situation of the past among the clothing possessed by the user based on the merged record information to output recommendation information to wear any one of the clothing.

As described above, when the first notifying unit 150 receives the clothing image information worn by the user who stays in front of the first clothing processing appliance 200 for a predetermined time or longer, the first notifying unit 150 may output a suitability determining result with a priority to weather information at a specific time zone in accordance with a user's purpose of wearing the clothing (the schedule information of the user and/or the transportation information on which the user rides).

When information indicating that the clothing worn by the user included in the first clothing image information is put into the first clothing processing appliance 200 or the second clothing processing appliance 300 is received, the second notifying unit 180 determines an operation mode of the first clothing processing appliance 200 or the second clothing processing appliance 300 based on the image information of the clothing worn by the user, weather information on a date when the clothing is worn, and merged record information. The second notifying unit 180 may output the operation mode of the first clothing processing appliance 200 or the second clothing processing appliance 300 through the user terminal 400. The second notifying unit 180 may receive the operation mode of the first clothing processing appliance 200 or the second clothing processing appliance 300 selected by the user through the user terminal 400 to be included in the merged record information.

Figure 6:
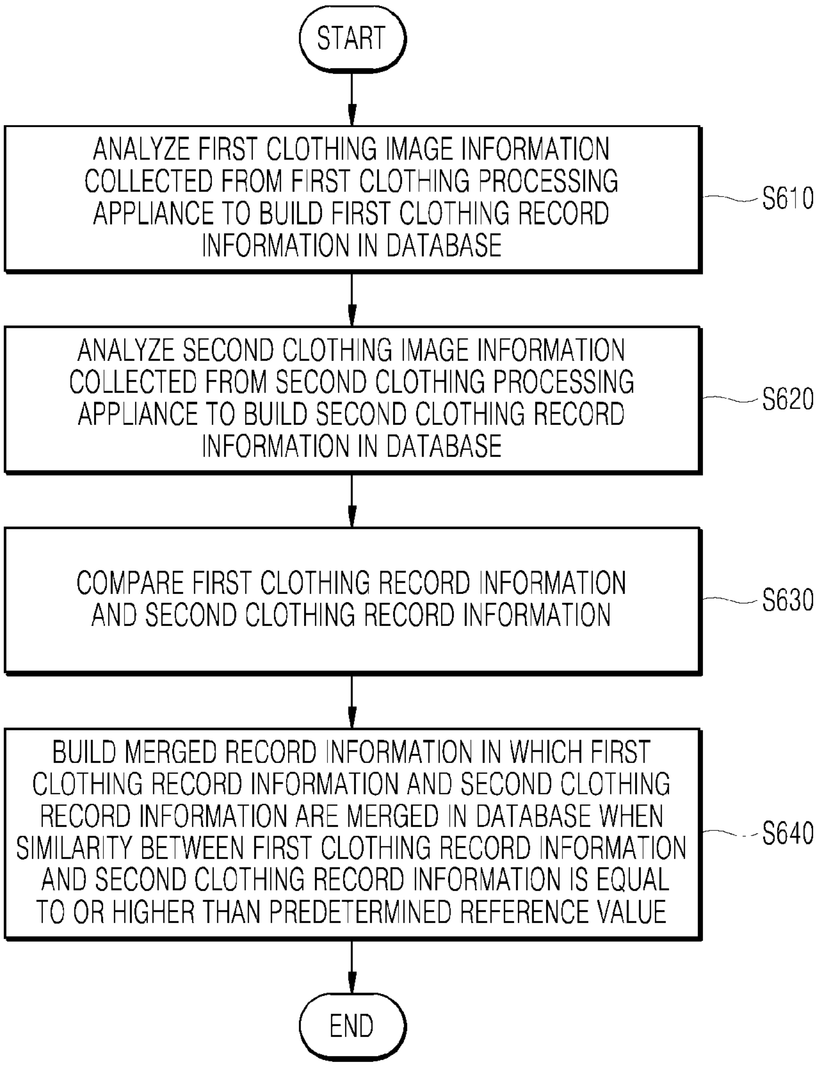
FIG. 6 is a flowchart for explaining a personal style database building method according to an exemplary embodiment of the present disclosure.

FIG. 6 is a flowchart for explaining a personal style database building method according to an exemplary embodiment of the present disclosure. Hereinafter, a repeated description of FIGS. 1 to 5 will be omitted.

Referring to FIG. 6, in step S610, the personal style database building apparatus 100 analyzes first clothing image information collected from the first clothing processing appliance 200 to generate first clothing property information and builds the first clothing property information in the database as first clothing record information. Here, the first record information built in the database may include first clothing property information, first date information when the first clothing image information is collected, first weather information corresponding to the first date information, user ID information for identifying user generated by face recognition of the user included in the first clothing image information. Further, the first clothing property information may include one or more of a type, a shape, a color, a pattern, a thickness, and a weight of a first clothing generated through analysis of the collected first clothing image information. Further, the first clothing processing appliance 200 may include the camera 210 to generate the first clothing image information and the camera 210 may be provided inside or outside the first clothing processing appliance 200. The personal style database building apparatus 100 may analyze the first clothing image information to generate first clothing property information using a deep neural network model which is trained in advance to analyze the clothing image information to extract property information of the clothing.

In step S620, the personal style database building apparatus 100 analyzes second clothing image information collected from the second clothing processing appliance 300 to generate second clothing property information and builds the second clothing property information in the database as second clothing record information. Here, the second record information built in the database may include the second clothing property information, second date information when the second clothing image information is collected, and second weather information corresponding to the second date information. Further, the second clothing property information may include one or more of a type, a shape, a color, a pattern, a thickness, and a weight of a second clothing generated through analysis of the collected second clothing image information. Further, the second clothing processing appliance 300 may include the camera (not illustrated) to generate the second clothing image information and the camera may be provided in the second clothing processing appliance 300. The personal style database building apparatus 100 may analyze the second clothing image information to generate second clothing property information using a deep neural network model which is trained in advance to analyze the clothing image information to extract property information of the clothing.

In step S630, the personal style database building apparatus 100 compares first clothing record information and second clothing record information.

In step S640, as the comparison result, when a similarity between the first clothing record information and the second clothing record information is equal to or higher than a predetermined reference value (for example 70%), the personal style database building apparatus 110 may build merged record information in which the first clothing record information and the second clothing record information are merged, in the database.

As a selective embodiment, the personal style database building apparatus 100 generates user ID information for identifying the user through the face recognition of the user included in the first clothing image information and includes the user ID information in the merged record information. As a selective embodiment, the personal style database building apparatus 100 may include the operation mode information of the first clothing processing appliance 200 and the operation mode information of the second clothing processing appliance 300 in the merged record information. As a selective embodiment, the personal style database building apparatus 100 may collect the schedule information of the user from the user terminal 400 and the transportation information on which the user rides to be included in the merged record information. As a selective embodiment, the personal style database building apparatus 100 may collect image information of clothing worn by the user who stays in front of the first clothing processing appliance 200 for a predetermined time (for example, 5 seconds) and time information when the clothing image information worn by the user is received to be included in the merged record information. As a selective embodiment, the personal style database building apparatus 100 receives the image information of the clothing worn by the user who stays in front of the first clothing processing appliance 200 for a predetermined time or longer, weather information on the date when the image information of the clothing worn by the user is received, and time information when the clothing image information worn by the user is received and generates a clothing recommendation deep neural network model for predicting clothing to be worn by the user at a specific time on a specific date based on the merged record information including the image information of the clothing worn by the user, the weather information, and the time information when the clothing image information worn by the user is received.

Further, after generating the clothing recommendation deep neural network model, the personal style database building apparatus 100 detects that the user stays in front of the first clothing processing appliance 200 for a predetermined time or longer, outputs clothing to be recommended to the user by applying the clothing recommendation deep neural network model based on the time information when the user stays in front of the first clothing processing appliance, receives an acceptance response or a rejection response for the clothing to be recommended from the user, and retrains the clothing recommendation deep neural network model in response to the acceptance response or the rejection response of the user. Here, the personal style database building apparatus 100 transmits information about the clothing to be recommended to the user through one or more of the first clothing processing appliance 200, the second clothing processing unit 300, and the user terminal 400 to allow the user to check the information.

As a selective embodiment, the personal style database building apparatus 100 may collect the schedule information of the user from the user terminal 400 and generate a clothing recommendation deep neural network model for predicting the clothing to be worn by the user at a specific time on a specific date based on the merged record information including the image information of the clothing worn by the user, the weather information, the time information when the clothing image information of the user is received, and the schedule information of the user.

As a selective embodiment, the personal style database building apparatus 100 may collect the transportation information on which the user rides from the user terminal 400 and generate a clothing recommendation deep neural network model for predicting the clothing to be worn by the user at a specific time on a specific date based on the merged record information including the image information of the clothing worn by the user, the weather information, the time information when the clothing image information of the user is received, and the transportation information on which the user rides.

As a selective embodiment, when the personal style database building apparatus 100 receives information indicating that the clothing worn by the user is put into the first clothing processing appliance 200 or the second clothing processing appliance 300, the personal style database building apparatus determines an operation mode of the first clothing processing appliance 200 or an operation mode of the second clothing processing appliance 300 based on the image information of the clothing worn by the user and the weather information on the date when the user wears the clothing built in the merged record information, transmits the operation mode of the clothing processing appliance 200 or the second clothing processing appliance 300 to the user terminal 400, and includes the operation mode of the clothing processing appliance 200 or the second clothing processing appliance 300 in the merged record information.

The example embodiments described above may be implemented through computer programs executable through various components on a computer, and such computer programs may be recorded in computer-readable media. Examples of the computer-readable media include, but are not limited to: magnetic media such as hard disks, floppy disks, and magnetic tape; optical media such as CD-ROM disks and DVD-ROM disks; magneto-optical media such as floptical disks; and hardware devices that are specially configured to store and execute program codes, such as ROM, RAM, and flash memory devices.

The computer programs may be those specially designed and constructed for the purposes of the present disclosure or they may be of the kind well known and available to those skilled in the computer software arts. Examples of program code include both machine code, such as produced by a compiler, and higher level code that may be executed by the computer using an interpreter.

As used in the present application (especially in the appended claims), the terms ‘a/an’ and ‘the’ include both singular and plural references, unless the context clearly states otherwise. Also, it should be understood that any numerical range recited herein is intended to include all sub-ranges subsumed therein (unless expressly indicated otherwise) and therefore, the disclosed numeral ranges include every individual value between the minimum and maximum values of the numeral ranges.

Also, the order of individual steps in process claims of the present disclosure does not imply that the steps must be performed in this order; rather, the steps may be performed in any suitable order, unless expressly indicated otherwise. In other words, the present disclosure is not necessarily limited to the order in which the individual steps are recited. All examples described herein or the terms indicative thereof (“for example”, etc.) used herein are merely to describe the present disclosure in greater detail. Therefore, it should be understood that the scope of the present disclosure is not limited to the example embodiments described above or by the use of such terms unless limited by the appended claims. Also, it should be apparent to those skilled in the art that various alterations, permutations, and modifications may be made within the scope of the appended claims or equivalents thereof.

The present disclosure is thus not limited to the example embodiments described above, and rather intended to include the following appended claims, and all modifications, equivalents, and alternatives falling within the spirit and scope of the following claims.

What is claimed is:

1. A personal style database building method, comprising:

analyzing first clothing image information collected from a first clothing processing appliance to generate first clothing property information and build the first clothing property information as first clothing record information in a database;

analyzing second clothing image information collected from a second clothing processing appliance to generate second clothing property information and build the second clothing property information as second clothing record information in the database;

comparing the first clothing record information and the second clothing record information; and building merged record information in which the first clothing record information and the second clothing record information are merged, in the database, when as a comparison result of the first clothing record information and the second clothing record information, a similarity between the first clothing record information and the second clothing record information is equal to or higher than a predetermined reference value.

2. The personal style database building method according to claim 1, wherein the building as the first clothing record information includes:

building the first clothing property information, first date information when the first clothing image information is collected, first weather information corresponding to the first date information, and user ID information generated by face recognition of a user included in the first clothing image information as the first clothing record information in the database, and wherein the building as the second clothing record information includes:

building the second clothing property information, second date information when the second clothing image information is collected, and second weather information corresponding to the second date information as the second clothing record information in the database.

3. The personal style database building method according to claim 1, wherein the building as the first clothing record information includes:

generating the first clothing property information by analyzing the first clothing image information using a deep neutral network model which is trained in advance to analyze clothing image information to extract property information of clothing.

4. The personal style database building method according to claim 1, wherein the building of the merged record information includes:

generating user ID information for identifying a user through face recognition of the user included in the first clothing image information to be included in the merged record information.

5. The personal style database building method according to claim 1, wherein the building of the merged record information includes:

collecting operation mode information of the first clothing processing appliance corresponding to clothing included in the first clothing image information;

collecting operation mode information of the second clothing processing appliance corresponding to clothing included in the second clothing image information; and including the operation mode information of the first clothing processing appliance and the operation mode information of the second clothing processing appliance in the merged record information.

6. The personal style database building method according to claim 1, wherein the building of the merged record information includes:

collecting schedule information of a user from a user terminal;

collecting transportation information on which the user rides from the user terminal; and including the schedule information of the user and the transportation information on which the user rides in the merged record information.

7. The personal style database building method according to claim 1, further comprising:

receiving clothing image information which is worn by a user who stays in front of the first clothing processing appliance for a predetermined time or longer;

receiving weather information on a date when the image information of the clothing worn by the user is received and time information when the clothing image information worn by the user is received; and generating a clothing recommendation deep neural network model for predicting clothing to be worn by the user at a specific time on a specific date based on the merged record information including the image information of the clothing worn by the user, the weather information, and the time information when the clothing image information worn by the user is received.

8. The personal style database building method according to claim 7, further comprising:

collecting schedule information of the user from a user terminal, wherein the generating of the clothing recommendation deep neural network model includes:

generating the clothing recommendation deep neural network model for predicting clothing to be worn by the user at a specific time on a specific date based on the merged record information including the clothing image information worn by the user, the weather information, the time information when the clothing image information worn by the user is received, and the schedule information of the user.

9. The personal style database building method according to claim 7, further comprising:

collecting transportation information on which the user rides, from a user terminal, wherein the generating of the clothing recommendation deep neural network model includes:

generating the clothing recommendation deep neural network model for predicting clothing to be worn by the user at a specific time on a specific date based on the merged record information including the clothing image information worn by the user, the weather information, the time information when the clothing image information worn by the user is received, and the transportation information on which the user rides.

10. The personal style database building method according to claim 7, further comprising:

after the generating of the clothing recommendation deep neural network model, detecting that the user stays in front of the first clothing processing appliance for a predetermined time or longer;

outputting clothing to be recommended to the user by applying the clothing recommendation deep neural network model based on time information when the user stays in front of the first clothing processing appliance;

receiving an acceptance response or a rejection response for the clothing to be recommended from the user; and retraining the clothing recommendation deep neural network model in response to the acceptance response or the rejection response of the user.

11. The personal style database building method according to claim 1, further comprising:

receiving information indicating that clothing worn by a user included in the first clothing image information is put into the first clothing processing appliance or the second clothing processing appliance;

determining an operation mode of the first clothing processing appliance or the second clothing processing appliance, based on the image information of the clothing worn by the user and weather information on a date when the clothing is worn;

transmitting the operation mode of the first clothing processing appliance or the second clothing processing appliance to a user terminal; and including the operation mode of the first clothing processing appliance or the second clothing processing appliance selected by the user in the merged record information.

* * * * *